S. R. HOCKMAN.
Hulling Machine.

No. 90,752.

Patented June 1, 1869.

Witnesses

Inventor
S. R. Hockman

S. R. HOCKMAN, OF URBANA, OHIO.

Letters Patent No. 90,752, dated June 1, 1869.

IMPROVED HULLING-MACHINE.

The Schedule referred to in these Letters Patent and making part of the same.

*To all whom it may concern:*

Be it known that I, S. R. HOCKMAN, of Urbana, in the county of Champaign, and State of Ohio, have invented a new and useful Improvement in Hulling-Machines; and I do hereby declare that the following is a full, clear, and exact description thereof, which will enable others skilled in the art to make and use the same, reference being had to the accompanying drawings, forming part of this specification.

This invention relates to improvements in hulling-machines, such as are used for hulling corn, barley, rice, and other grains, the object of which is to provide a more simple and economical machine than those now in use.

In the accompanying drawings—

Figure 1:
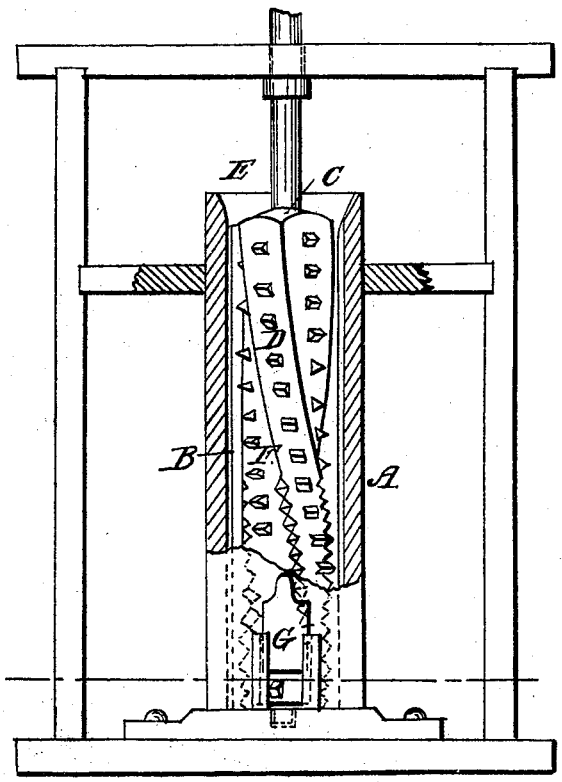
Figure 2:
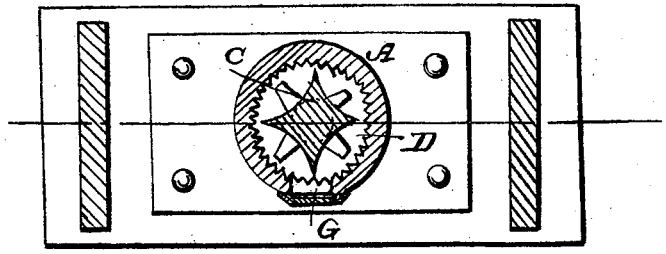

Figure 1 represents an elevation, partly in section, of my improved machine; and Figure 2 represents a horizontal section, taken on the line $x\,x$ of fig. 1.

Similar letters of reference indicate corresponding parts.

A represents a hollow vertical cylinder, preferably made of cast-iron, and chilled, and grooved on the inner surface, as represented at B.

C represents a spiral-fluted shaft, provided with sharpened pins, D, projecting from its several faces, at about the same distance radially as the corners E, of the shaft, and the latter are notched, as shown at F, for a portion of their length.

The grain to be operated upon is spouted in at the top of the cylinder, and is delivered at the gate G, after having been operated upon.

This arrangement provides a very cheap machine, which requires but a small amount of power for working it.

I am aware of the patent granted to Alfred and William J. Duvall, January 9, 1838, in which is shown a plain cylinder, provided, upon its periphery, with spirally-arranged teeth, and the patent of B. Bridendolph, August 22, 1854, which shows a spirally-grooved cylinder, having its edges serrated; but neither of these features constitutes my invention, and I do not, therefore, claim them.

What I do claim as new, and desire to secure by Letters Patent, is—

The combination of the sharpened radial pins D with spirally-fluted shaft C, and longitudinally-grooved cylinder A, said pins being arranged in spiral lines, as shown, for the purpose specified.

S. R. HOCKMAN.

Witnesses:
L. H. LONG,
JOHN S. LEEDOM.